May 18, 1926. 1,584,731
C. CHRISTENSEN
OUTDOOR DISCONNECTING SWITCH
Filed April 6, 1923  2 Sheets-Sheet 1
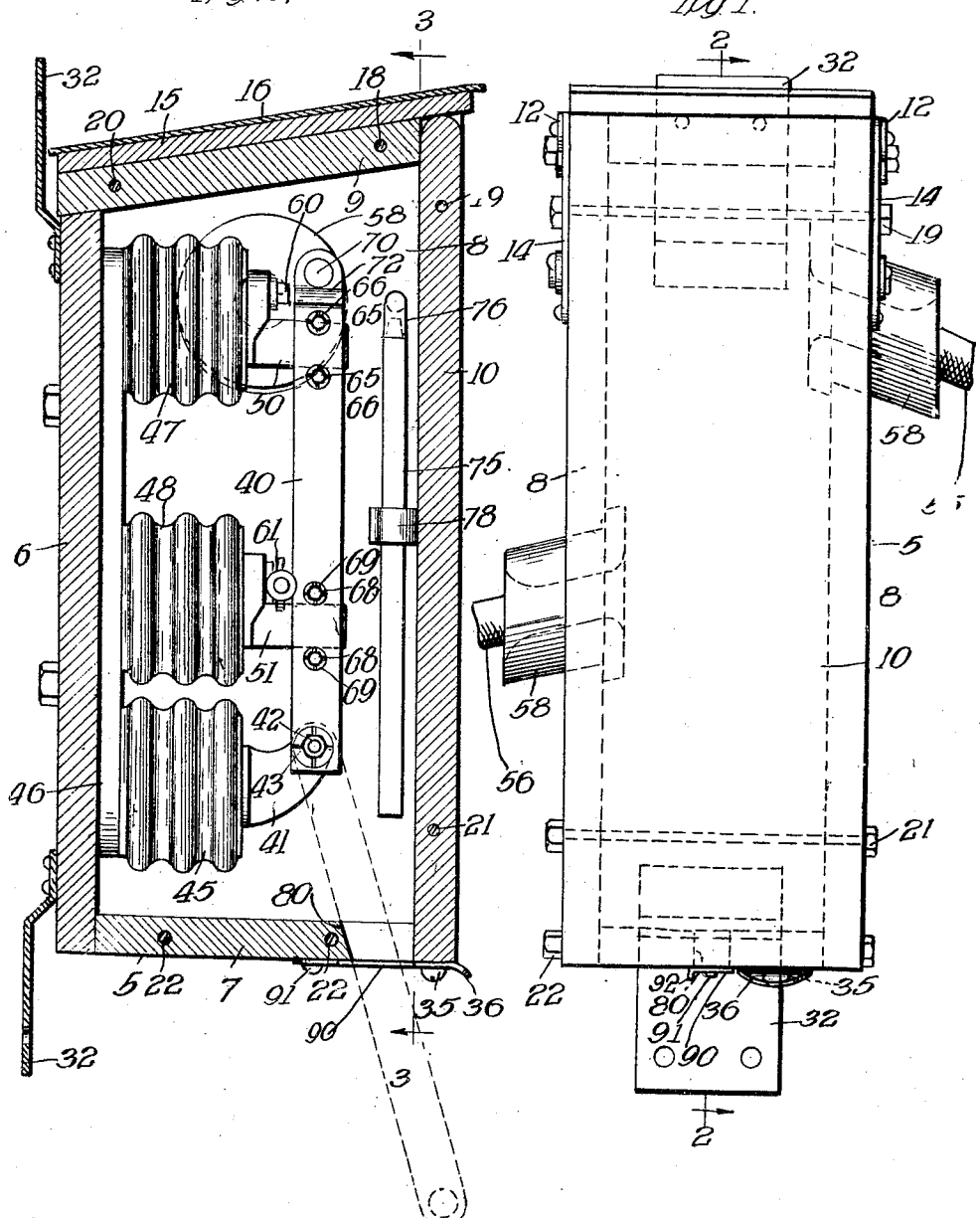
Witnesses:
Harry B. White
W. P. Kilroy
Inventor:
Christen Christensen
By Brown, Boettcher & Dienner
Attys May 18, 1926.
C. CHRISTENSEN
OUTDOOR DISCONNECTING SWITCH
Filed April 6, 1923   2 Sheets-Sheet 2
1,584,731
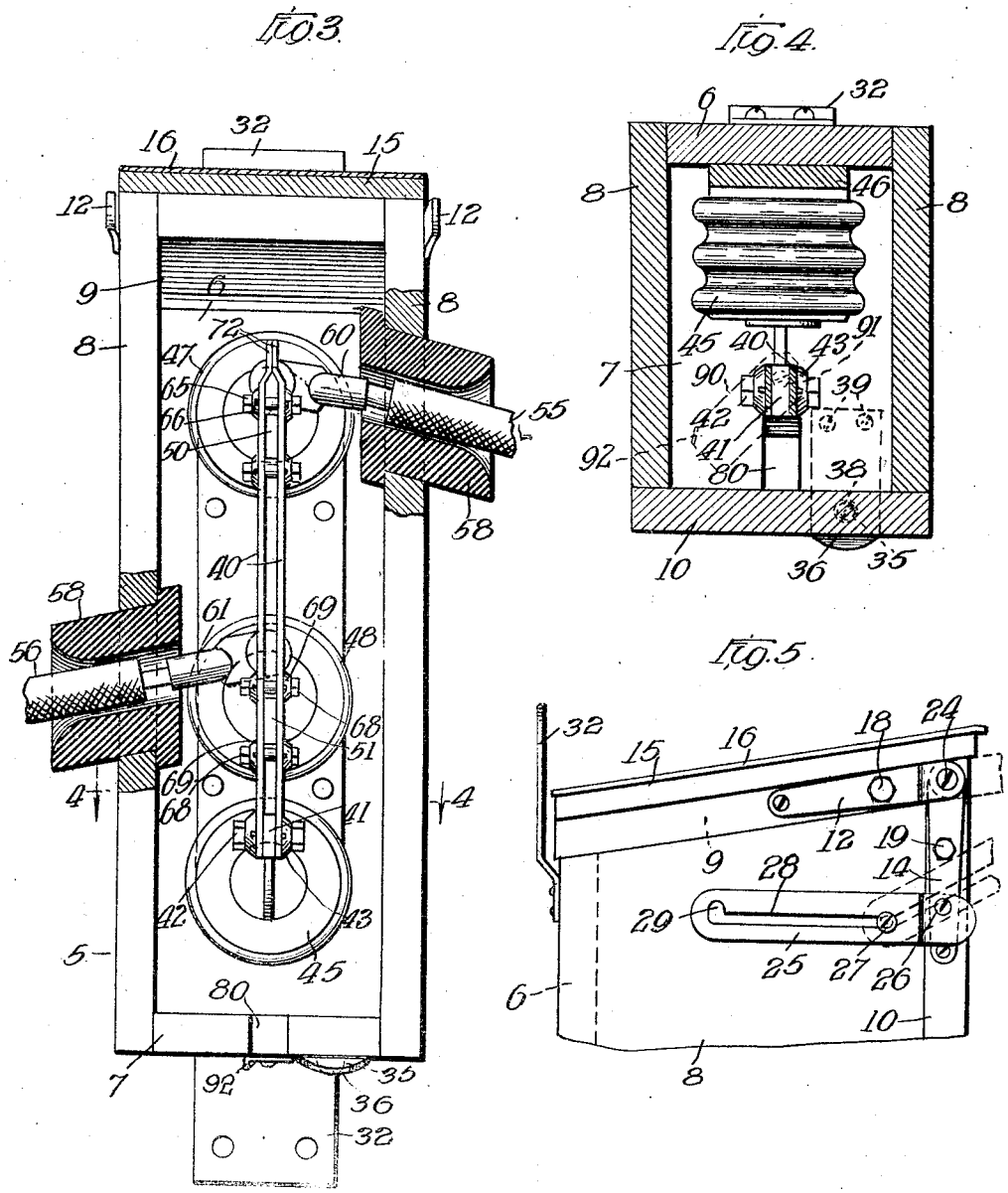

Patented May 18, 1926.

1,584,731

UNITED STATES PATENT OFFICE.

CHRISTEN CHRISTENSEN, OF CHICAGO, ILLINOIS, ASSIGNOR TO ELECTRICAL ENGINEERS EQUIPMENT CO., OF CHICAGO, ILLINOIS, A CORPORATION OF ILLINOIS.

OUTDOOR DISCONNECTING SWITCH.

Application filed April 6, 1923. Serial No. 630,205.

My invention relates to disconnecting switches.

While the particular device which I shall describe in connection with the drawings is especially adapted for outdoor high tension service it is to be understood that it is not limited to such use. Certain features of the invention may be advantageously employed in other types of switches.

In power house and sub-station transmission installations the disconnecting or sectionalizing switch is usually disposed in the transmission line just outside the power house or sub-station so that the line may be opened where it enters the station to disconnect all of the station apparatus and permit repairs and adjustment of the circuit breaker and other apparatus in the station without danger of injury from the line potential. The disconnect switch usually functions as an auxiliary switching device operating in conjunction with an oil circuit breaker or other type of switching device of high power interrupting capacity. Outdoor disconnecting switches are also required for disconnecting branch circuits from the main line, also for sectionalizing the main line or disconnecting a section or number of sections of the main line in case of trouble.

Switches of this sort are subject to severe weather conditions. Protection against accumulations of ice, sleet, snow, frost and the like, is therefore desirable. Protection against accidental contact with live switch parts is also desirable, especially in switches of this type. If the switch parts are all completely enclosed in a box or container when in open as well as when in closed condition, a relatively large box is required and opening of the box is necessary to ascertain whether the switch is opened or closed, unless of course some additional indicating arrangement is provided. These are usually unreliable and they add to the cost and make the structure more complicated. Opening of the box exposes the live parts of the switch.

According to my invention I arrange the live switch parts in a switch box. When the switch is open the blade or blades, as the case may be, project from the box. When the switch is closed the blade is positioned wholly within the box. The condition of the switch is thereby indicated without the necessity of opening the box and without additional indicating devices. The switch box has a cover which is adapted to be closed when the switch is closed to encase the switch blade and other live parts of the switch. The cover is also adapted to be closed with the switch open and the blade projecting from the box. The switch member or blade itself is preferably disconnected from the circuit when the switch is open and the blade projects from the box and is adapted to bridge contact terminals in the circuit to connect said terminals and complete the circuit when moved into closed position in the box. The box thereby encloses all live parts of the switch when the switch is open as well as when closed and the blade when projecting from the box is dead and the danger of injury and damage from accidental contact therewith is avoided. Suitable latch or catch means preferably holds the cover closed so that deliberate opening of the cover is required to gain access to the live switch parts within the box. Key controlled or other suitable locking means may be provided for locking the box closed against unauthorized access if so desired.

The chief advantages of my invention are the provision of a weather proof disconnecting switch; the provision for indicating open condition of the switch by projection of the blade itself from the switch box and the arrangement of the live switch parts at all times within the switch box and disconnection of the blade from the circuit when in projecting position to avoid danger of accidental contact therewith. Certain details of the box are important. Certain details of the switch are also important. In the latter connection self-aligning blades are provided which are free to adjust themselves properly to the sides of the terminal lugs in spite of slight differences in the thicknesses and positioning of the live terminal lugs and the "dead" pivot lug.

In order to apprise those skilled in the art with the construction and operation of my invention I shall describe an embodiment of the invention in connection with the accompanying drawings in which—

Figure 1 is a front elevational view of the embodiment of the invention selected for illustration, showing the cover of the switch box in closed position.

Figure 2 is a vertical section through the box on line 2—2 of Figure 1 showing the switch in side elevation therein.

Figure 3 is a vertical section on line 3—3 of Figure 2 showing the switch in front elevation.

Figure 4 is a horizontal section on line 4—4 of Figure 3, and

Figure 5 is a fragmentary side elevation of the switch box showing the mounting of the cover.

Referring to the drawings, box 5 comprises a vertical back wall 6, bottom wall 7, side walls 8 and inclined top wall 9.

The open front of box 5 is closed by a cover 10 pivoted at its upper edge between the forwardly projecting ends of straps 12 secured to top wall 9. The pivotal mounting of cover 10 may be through a single bolt extending through straps 12 and through the upper edge of cover 10 or through bolts or studs cooperating simply with straps 12 and straps 14 secured to the opposite vertical edges of cover 10. The forward edge of a roof 15 mounted upon top wall 9 projects out over the upper edge of cover 10 (Figure 2) to prevent the entrance of snow, sleet, rain and the like into the box at that point. Roof 15 is covered with tarred roofing paper 16 or a sheet or layer of other suitable water and snow proof material.

Box 5 is preferably made of cypress which is little affected by severe weather conditions and the cypress box is treated with suitable means, such as creosote, to prevent its decay.

The width of cover 10 is substantially the same as the distance between the outside surfaces of side walls 8, the forward projecting ends of straps 12 being offset outwardly as shown, to receive the upper ends of straps 14 therebetween. Bolts 18 and 19 and additional bolts 20 and 21 preferably extend completely through the top wall 9 and cover 10 to bind the same against warping. Similar bolts 22 extend through bottom wall 7 for the same purpose. Links or straps 25 pivoted at their forward ends to straps 14 at 26 extend back along side walls 8. Pins or screws 27 secured in and projecting from side walls 8 engage in slots 28 in links 25. The inner ends of slots 28 terminate in laterally offset portions 29. When cover 10 is swung into its open position shown fragmentarily in dotted lines in Figure 5 links or straps 25 follow the movement of the cover. When said straps reach the position shown in dotted lines in Figure 5 they drop to engage pins 27 in laterally offset portions 29 and this holds the door or cover in open position. The opening movement of cover 10 may be limited by engagement of pins 27 with the ends of slots 28 or by engagement of links 25 with the head of bolt 19 at one end and the nut thereon at the opposite end or both. The rear wall 6 carries mounting brackets 32 by which the device is mounted as desired.

A screw 35 secured to the lower edge of cover 10 has a protecting head which is adapted to engage in an opening 38 (Figure 4) in a spring latch plate 36, secured to bottom wall 7 by screws 39, to hold cover 10 closed. To open cover 10 spring plate 36 is sprung down to disengage the head of screw 35 from opening 38 and cover 10 is then free to be swung into the desired open position. In closing cover 10, engagement of the head of screw 35 with the downturned lip of spring plate 36 springs the forward end of plate 36 downwardly and the head of screw 35 along the upper surface of said plate to opening 38 whereupon plate 36 springs up to engage over screw 35 and thereby latch cover 10 in closed position.

The switch comprises a pair of blades 40—40 which are clamped at one end to a stationary pivot lug 41 by means of a bolt 42 and a pair of spring washers 43. Pivot lug 41 is mounted upon the outer end of an insulator 45 which is in turn mounted upon and projects outwardly from a base or panel 46. Base or panel 46 is secured to or mounted upon rear wall 6 of box 5 and a pair of supporting insulators 47 and 48 are mounted upon said panel and project therefrom in alignment with insulator 45. At their outer ends insulators 47 and 48 support terminal lugs 50 and 51 respectively mounted upon the outer ends of said insulators in alignment with pivot lug 41. Terminal lugs 50 and 51 are electrically connected into the circuit in which the switch is arranged by leading conductors 55 and 56 of said circuit into box 5 through bushings of insulation 58 and securing said conductors in socket terminals 60 and 61 mounted upon the outer ends of insulators 47 and 48 in good electrical contact with terminal lugs 50 and 51.

Bushings 58 have annular retention flanges at their inner ends and the projecting portions are inclined or extend obliquely downwardly from said flanges through side walls 8. By this formation bushings 58 maintain themselves properly positioned and at the same time they direct any snow, rain or the like, downwardly away from the openings through side walls 8 to prevent entrance of same into the switch box.

Blades 40 are floating and free to spread and adjust themselves to the surfaces of terminal lugs 50 and 51 to at all times secure a firm contact over a maximum area. Blades 40 are held in firm contact with the opposite sides of terminal lug 50 by a pair of bolts 65 and cooperating spring washers 66, one bolt, and pair of washers adjacent the upper and another bolt and pair of washers adjacent the lower edge of lug 50. The blades 40 are similarly held in firm contact with the opposite sides of terminal lug 51 by a pair of bolts 68 and cooperating spring washers 69. The outer ends of blades 40 are offset toward each other and the projecting offset ends have an eye 70. Engagement of offset portions 72 serves to prevent blades 40 from being drawn too closely together by bolts 65 and 68.

The switch is operated by the hook comprising a wood handle 75 having a hook head 76 mounted thereon, (Figure 2). This opening tool is shown mounted in a spring clip 78 on the inner surface of cover 10. To open the switch, cover 10 is opened, hook 75 removed from clip 78 and the hook head inserted in eye 70. Blades 40 are then swung out of contact with lugs 50 and 51 and down into the position shown in dotted lines in Figure 2 by pulling hook 75, bottom wall 7 of box 5 having a slot 80 into which blades 40 are swung when in open position and through which they extend so as to not interfere with proper closing of cover 10. Tool 75 is then replaced in clip 78 and upon swinging the inner ends of links 25 upwardly slightly to disengage pins 27 from the laterally offset portions of slot 28 the cover is swung into closed position and latched by plate 36.

From the foregoing it will now be apparent that projection of blades 40 through bottom wall 7 indicates that the switch is open without the necessity of opening cover 10 and without additional indicating means. When blades 40 are swung up into engagement with terminal lugs 50 and 51 and into position within box 5 the switch is shown to be in closed position. Terminal lugs 50 and 51 which are electrically connected into the circuit in which the switch is arranged, are at all times encased in box 5 and blades 40 when swung into engagement with said lugs to complete or close the circuit is likewise completely encased in box 5. The live part of the switch being at all times completely encased, danger of injury or damage from accidental contact therewith is avoided. Lug 41 is dead; that is, it is not electrically connected into the circuit. Therefore, when the switch is opened and blades 40 are swung into projecting position from the box, said blades are disconnected from the circuit and likewise "dead" so that although projection of the blades is utilized to indicate the open condition of the switch there are at no times any live switch parts projecting from box 5.

The floating blade arrangement described is particularly suited for the switch shown, in that proper engagement of the blades with live terminals 50 and 51 is permitted in spite of slight variations in thickness and positioning of lugs 50 and 51 and "dead" lug 47. Box 5 need be only large enough to enclose the live parts when the switch is closed, large dimensions to permit swinging of the blade into open position and to enclose a live blade when the switch is open are avoided. An exceedingly simple inexpensive and compact construction is the result.

The mounting of the three insulators 45, 47 and 48 on common base 46, which is preferably of metal, holds the insulators and pivot lug 41 and circuit terminals 50 and 51 carried thereby in proper alignment in spite of shrinkage or warping of the enclosing box.

A closure plate 90 pivoted at 91 to the under surface of bottom wall 7 has a downturned corner 92 which is adapted to be grasped to swing the closure plate into position over slot 80 to close the same when blades 40 are positioned up in box 5. When the switch is to be opened said plate 90 is swung into the dotted line position shown in Figure 4 to uncover slot 80.

I do not intend to limit the invention to the precise details illustrated and described.

I claim:

1. In combination, a switch box, a switch therein, said switch having a movable switch member, said member projecting from said box when in open position and a cover for closing said box with said movable switch member projecting therefrom, said cover when closed lying in the path of closing movement of the switch member and preventing closing thereof.

2. In combination, a switch including circuit terminals and a movable switch member, a box enclosing said terminals, said box enclosing said movable switch member when said member is in closed position, said switch member projecting from said box when in open position and a cover for closing said box with said movable switch member in position therein and also with said movable switch member projecting therefrom.

3. In combination, a switch box having side, top, back and bottom walls, and an open front, supporting insulators mounted in said box on the back wall, a pair of circuit terminals carried by a pair of said supporting insulators, a dead pivot lug carried by a third supporting insulator, a switch blade pivoted on said lug and movable into and out of engagement with said circuit terminals to connect and disconnect said terminals, the bottom wall of the switch box having a slot through which the switch blade projects when in open position and a cover for the front of said box.

4. In combination, a switch box having side, top, back and bottom walls and an open front, supporting insulators mounted in said box on the back wall, a pair of circuit terminals carried by a pair of said supporting insulators, a dead pivot lug carried by a third supporting insulator, a switch blade pivoted on said lug and movable into and out of engagement with said circuit terminals to connect and disconnect said terminals, the bottom wall of the switch box having a slot through which the switch blade projects when in open position and a cover for the front of said box, said cover closing the open front of said box with said blade in closed and also with said blades in open position.

5. In combination, a switch box having side, top, back and bottom walls and an open front, supporting insulators mounted in said box on the back wall, a pair of aligned circuit terminals carried by a pair of said supporting insulators, circuit conductors lead in through downwardly inclined insulating bushings mounted in side walls of said box and electrically connected with said circuit terminals, a dead pivot lug carried by a third supporting insulator in alignment with said circuit terminals, a switch blade pivoted on said lug and movable into and out of engagement with said circuit terminals to connect and disconnect said terminals, the bottom wall of the switch box having a slot through which the switch blade projects when in open position and a cover for the front of said box.

6. In combination, an open sided housing having a closure, a switch blade pivoted in the housing and adapted when opened to swing out of said open side, a pair of contacts adapted to be connected into a circuit, said contacts being connected by the blade when the switch is in closed position, and disconnected from each other and from the blade when the blade is in open position, said closure preventing opening of the blade when it is in closed position and preventing closing of the blade when it is in open position.

7. In combination, a switch casing, a switch therein, said switch having a movable switch member adapted to be moved into open and closed positions, and a cover interposed when in a shut position directly in the path of movement of the movable switch member to prevent the movable switch member from being moved into its closed position.

8. In combination, a switch casing, a switch therein, said switch having a movable switch member adapted to project from said casing when in an open position, and a cover for the said casing adapted to be moved into a shut position when the movable member is projecting from the casing, said cover when in closed position preventing the said member from being moved into a closed position.

9. In combination, a casing, a switch therein including a terminal and a switch blade adapted to be moved into and out of engagement therewith, said switch blade when disengaged from the terminal projecting outside of the casing, and a cover for the casing adapted when shut to prevent the switch blade from being moved into engagement with the terminal, the projecting end of the blade being visible when the cover is in its closed position.

10. In combination, a switch casing, a switch therein, said switch having a movable switch member adapted to be moved into open and closed positions, and a cover for said casing, said cover lying when in closed position in the path of movement of said movable switch member and permitting completely open and closed positions of said movable switch member with said cover in closed position.

In witness whereof, I hereunto subscribe my name this 30th day of March, 1923.

CHRISTEN CHRISTENSEN.